(12) United States Patent
Kobayashi (10) Patent No.: US 10,263,479 B2
(45) Date of Patent: Apr. 16, 2019

(54) ELECTRICAL ROTATING MACHINE

(71) Applicant: YAMAHA HATSUDOKI KABUSHIKI KAISHA, Iwata-shi, Shizuoka (JP)

(72) Inventor: Takayuki Kobayashi, Iwata (JP)

(73) Assignee: YAMAHA HATSUDOKI KABUSHIKI KAISHA, Iwata-shi, Shizuoka (JP)

( * ) Notice: Subject to any disclaimer, the term of this patent is extended or adjusted under 35 U.S.C. 154(b) by 253 days.

(21) Appl. No.: 15/266,658

(22) Filed: Sep. 15, 2016

(65) Prior Publication Data

US 2017/0077767 A1 Mar. 16, 2017

(30) Foreign Application Priority Data

Sep. 16, 2015 (JP) .................................. 2015-183399
Sep. 12, 2016 (JP) .................................. 2016-177771

(51) Int. Cl.
| | |
|---|---|
| *H02K 1/14* | (2006.01) |
| *H02K 3/18* | (2006.01) |
| *H02K 1/27* | (2006.01) |
| *H02K 21/12* | (2006.01) |

(52) U.S. Cl.
CPC ............ *H02K 1/146* (2013.01); *H02K 1/148* (2013.01); *H02K 1/2706* (2013.01); *H02K 1/2786* (2013.01); *H02K 3/18* (2013.01); *H02K 21/12* (2013.01)

(58) Field of Classification Search
CPC ...... H02K 1/148; H02K 1/146; H02K 1/2786; H02K 3/18; H02K 21/12; H02K 1/2706; H02K 1/14; H02K 1/141

USPC .... 310/126.109, 216.009, 216.008, 216.006, 310/216.038, 44, 216.067
See application file for complete search history.

(56) References Cited

U.S. PATENT DOCUMENTS

| | | | | |
|---|---|---|---|---|
| 6,658,721 | B2 * | 12/2003 | Kazama ................... | H02K 1/12 29/596 |
| 9,000,650 | B2 * | 4/2015 | Bach Andersen ..... | H02K 1/148 310/216.007 |
| 2009/0127970 | A1 * | 5/2009 | Tatematsu ................ | H02K 1/02 310/216.067 |

(Continued)

FOREIGN PATENT DOCUMENTS

| | | |
|---|---|---|
| CN | 101258665 A | 9/2008 |
| CN | 101841193 A | 9/2010 |

(Continued)

*Primary Examiner* — Forrest M Phillips
(74) *Attorney, Agent, or Firm* — Rabin & Berdo, P.C.

(57) ABSTRACT

Provided is a stator for an electrical rotating machine. The stator includes a stator core having a magnetic material. The stator core includes a cylindrical yoke extending in an axial direction of the stator. The yoke includes a plurality of yoke pieces having fracture surfaces disposed relative to each other along a circumferential direction of the yoke. The fracture surfaces of mutually adjacent yoke pieces of the plurality of yoke pieces have the fracture surfaces thereof in direct contact with each other. The stator core further includes a plurality of teeth extending in a radial direction from the yoke. Each of the teeth is provided on at least one of the plurality of yoke pieces. The stator further includes a stator coil wound around the teeth.

10 Claims, 3 Drawing Sheets

(56) References Cited

U.S. PATENT DOCUMENTS

| | | | |
|---|---|---|---|
| 2009/0179517 A1* | 7/2009 | Lu | H02K 1/148 |
| | | | 310/216.009 |
| 2009/0261684 A1* | 10/2009 | Onimaru | H02K 1/16 |
| | | | 310/207 |
| 2010/0231084 A1* | 9/2010 | Kinoshita | H02K 1/148 |
| | | | 310/216.009 |
| 2011/0047780 A1 | 3/2011 | Akita et al. | |
| 2016/0133364 A1* | 5/2016 | Degner | H02K 1/02 |
| | | | 310/216.067 |
| 2016/0164350 A1* | 6/2016 | Matsunaga | H02K 1/148 |
| | | | 310/216.009 |

FOREIGN PATENT DOCUMENTS

| | | |
|---|---|---|
| CN | 102057556 A | 5/2011 |
| CN | 103516080 A | 1/2014 |
| JP | 2011-019360 A | 1/2011 |

* cited by examiner

ELECTRICAL ROTATING MACHINE

BACKGROUND OF THE INVENTION

1. Field of the Invention

The present invention relates to an electrical rotating machine including a stator.

2. Background Art

Conventionally, motors serving as electrical rotating machines for driving devices have been used. Examples of known configurations of such motors include a stator including a stator core and a stator coil, and a rotor including a rotor core and magnet. In a motor having this configuration, the stator core includes a cylindrical yoke and a plurality of teeth extending in the radial direction of the yoke from the inner circumferential surface or the outer circumferential surface of the yoke. The motor having the above-described configuration includes a stator coil wound around the teeth.

In recent years, there has been a demand for increasing the output torque of a motor in order to increase the output of a device driven by the motor, without increasing the motor size. To increase the output torque of a motor having the above-described configuration, it is conceivable to use a method in which the number of turns of the stator coil is increased, or a method in which the magnetic flux density of the rotor is increased.

In the case of increasing the number of turns of the stator, it is possible to adopt a configuration in which the yoke of the stator core is split into a plurality of components in the circumferential direction such that one tooth is included in each of the component. For example, as disclosed in JP 2011-19360A, a motor is known in which the stator core is formed with a plurality of split cores that are split in the circumferential direction, and each of the yokes of the split cores contacts the yoke of the adjacent split core.

SUMMARY OF THE INVENTION

The inventors of the present application discovered that by forming the stator core with a plurality of split cores as disclosed in JP 2011-19360A, the stator coil can be easily wound around each of the teeth of the split cores. Accordingly, after the stator coil has been wound around each of the teeth by using a winding nozzle, the plurality of split cores around each of which the stator coil is wound can be connected in a state in which the yokes are arranged so as to contact each other. This makes it possible to achieve a wider interval between the tips of the teeth at the time of winding the stator coil around the teeth of the split cores than in the case of using an annular stator core. Accordingly, it is possible to increase the number of turns of the stator coil wound around the teeth, thus increasing the space factor of the stator coil in a slot. Therefore, it is possible to improve the motor efficiency.

Meanwhile, when the yoke of the stator core is formed with a plurality of components as disclosed in JP 2011-19360A, each of the contact surfaces of mutually adjacent components is a flat surface. In general, it is difficult to bring flat surfaces into contact with each other without forming a gap therebetween. For this reason, a gap is formed between the contact portions of components that are mutually adjacent so as to form a yoke. This gap increases the magnetic resistance of the yoke.

Accordingly, even when the number of turns of the stator coil for the teeth can be increased by forming the yoke of the stator core with a plurality of components as in the configuration disclosed in JP 2011-19360A, the magnetic flux density generated in the stator is not significantly increased. Thus, it is not possible to increase the output torque of the motor.

On the other hand, it is preferable to suppress an increase in the magnetic resistance of the yoke in order to increase the magnetic flux density generated in the stator. For this purpose, it is preferable that the yoke is integrally formed, rather than being formed with a plurality of components as described above. However, when the yoke is integrally formed, it is not possible to increase the number of turns of the stator coil wound around the teeth.

As described thus far, it has been difficult to achieve both an increase in the number of turns of the stator coil and a suppression of an increase in the magnetic resistance of the stator core for the purpose of increasing the magnetic flux density of the stator.

Therefore, it is an object of the present invention to provide an electrical rotating machine capable of achieving both an increase in the number of turns of the stator coil and a suppression of an increase in the magnetic resistance of the stator core.

When the yoke of the stator core is formed with a plurality of components as disclosed in JP 2011-19360A, the flat surfaces of the mutually adjacent components come into surface contact with each other. Accordingly, a gap is formed between the contact portions of the mutually adjacent components.

In this respect, by forming irregularities on each of the contact surfaces of the components constituting the yoke, the number of contact points between the components can be increased. Doing so can reduce the gaps formed between the contact portions of the components, thus making it possible to increase the magnetic flux density generated in the stator core.

In order to form irregularities on the contact surfaces of the components constituting the yoke, the present inventors focused their attention on a dust core that uses particulates including particles of a magnetic material. The dust core is an aggregate of particulates including particles of a magnetic material. Therefore, at the time of fracturing the dust core, the fracture proceeds along the boundary between the particles. Accordingly, irregularities tend to be formed on the fracture surfaces.

The present inventors have focused their attention on the above-described characteristics of the dust core that uses particulates including particles of a magnetic material, and have arrived at the following configuration.

An electrical rotating machine according to an embodiment of the present invention is an electrical rotating machine including a stator. The stator includes: a stator core that is a dust core including particulates having particles of a magnetic material, the stator core including a cylindrical yoke extending in an axial direction of the stator, the yoke including a plurality of yoke pieces having fracture surfaces disposed relative to each other along a circumferential direction of the yoke, adjacent fracture surfaces of the fracture surfaces of mutually adjacent yoke pieces of the plurality of yoke pieces having the adjacent fracture surfaces in contact with each other, and a plurality of teeth extending in a radial direction of the yoke from an inner circumferential surface of the yoke or an outer circumferential surface of the yoke, each of the teeth is provided on each of at least one of the plurality of yoke pieces; and a stator coil wound around the teeth.

With the electrical rotating machine according to an embodiment of the present invention, it is possible to achieve both an increase in the number of turns of the stator coil and a suppression of an increase in the magnetic resistance of the stator core.

EXEMPLARY EMBODIMENTS

Hereinafter, embodiments will be described with reference to the drawings. It should be understood that the dimensions of the constituent members in the drawings are not faithful representation of the dimensions of actual constituent members, dimensional ratios of those members, and the like.

<Overall Configuration of Motor>

Figure 1:
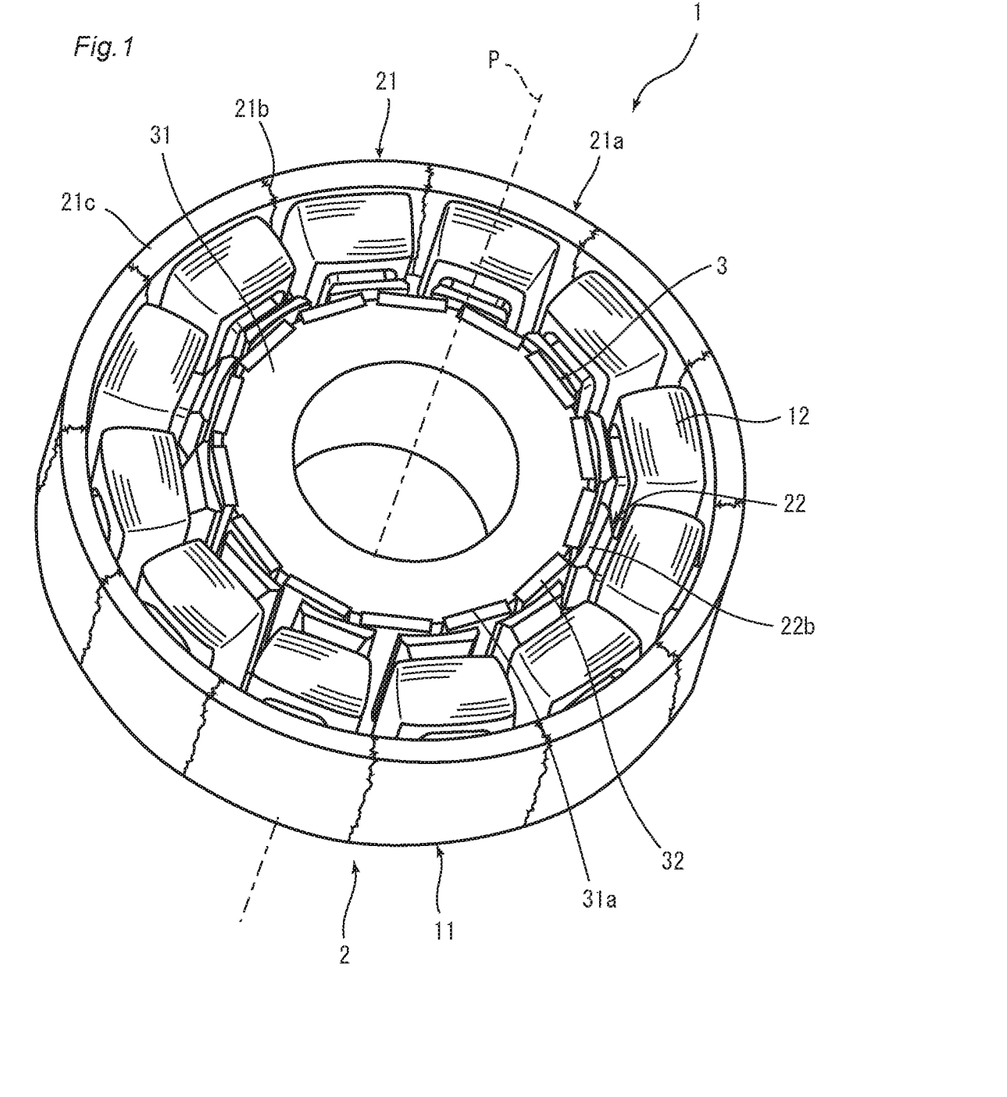
FIG. 1 is a perspective view showing an overall configuration of a motor according to an embodiment of the present invention.

FIG. 1 is a perspective view showing an overall configuration of a motor 1 (electrical rotating machine) according to an embodiment of the present invention. The motor 1 includes a cylindrical stator 2 and a cylindrical rotor 3 disposed inward of the stator such that its center of rotation coincides with an axis P of the stator 2. That is, the motor 1 is formed in a cylindrical shape as a whole. The motor 1 may be used, for example, as a motor for assisting the pedaling force of a power-assisted bicycle. In FIG. 1, reference numeral P indicates an axis extending in the cylinder axis direction of the stator 2.

The stator 2 includes a stator core 11 formed in a cylindrical shape and a stator coil 12 wound on the stator core 11. The stator core 11 is a dust core made of particulates including particles of a magnetic material. That is, the stator core 11 is integrally molded by pressing the particulates at a predetermined pressure by using a mold.

Figure 2:
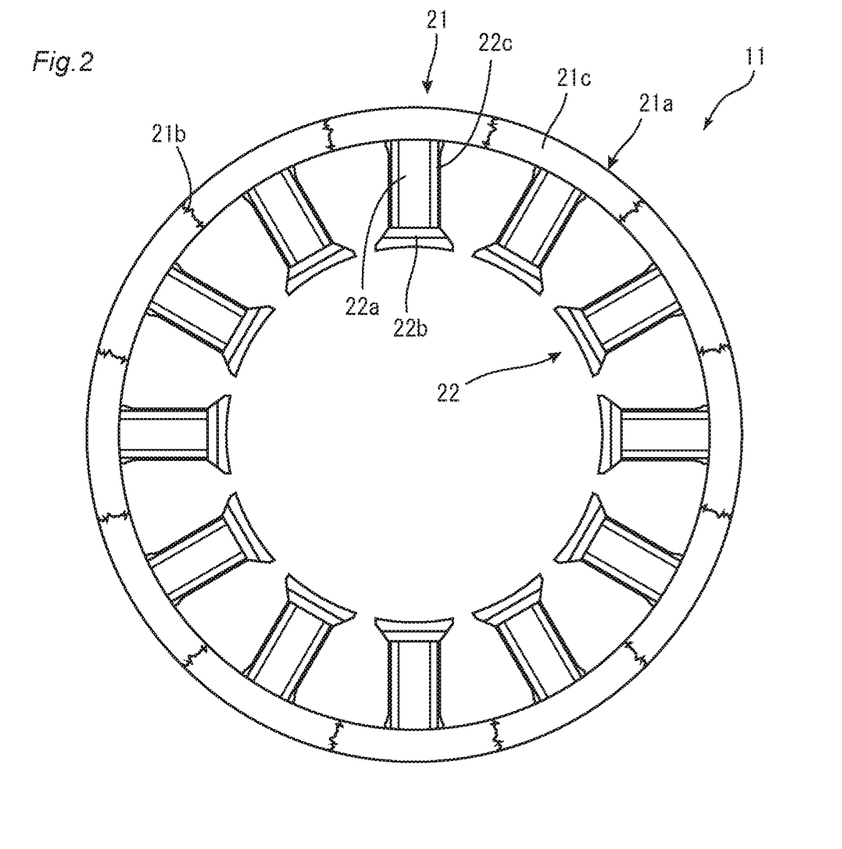
FIG. 2 is a front view showing a configuration of a stator core.

FIG. 2 shows a specific configuration of the stator core 11. FIG. 2 is a front view showing the stator core 11 as viewed from the axial direction of the stator 2. As shown in FIG. 2, the stator core 11 includes a yoke 21 and a plurality of teeth 22. In the present embodiment, the stator core 11 has twelve teeth 22.

The yoke 21 is formed in a cylindrical shape. Each of the teeth 22 extends inwardly of the yoke 21 from the inner circumferential surface of the yoke 21. The plurality of teeth 22 are formed on the inner circumferential surface of the yoke 21 so as to be arranged at equal intervals in the circumferential direction, as viewed from the axial direction of the stator 2.

In the stator core 11, the cylindrical yoke 21 is fractured and split into a plurality of parts in the circumferential direction as shown in FIGS. 1 and 2. That is, the stator core 11 includes a plurality of yoke pieces 21a formed by fracturing and splitting. The stator core 11 is fractured and split such that the yoke pieces 21a each include one of the teeth 22. Accordingly, the stator core 11 is fractured and split into the same number of yoke pieces 21a as the number of the teeth 22. In the present embodiment, the stator core 11 is split into twelve parts in the circumferential direction such that the yoke pieces 21a include the corresponding teeth 22. The details of the fracturing and splitting of the stator core 11 will be described later.

Each tooth 22 is formed in a substantially T-shape as viewed from the axial direction of the stator 2. That is, the tooth 22 includes a tooth body portion 22a extending inwardly of the yoke 21 from the inner circumferential surface of the yoke 21, and a tooth tip portion 22b that is located closer to the tip of the tooth 22 than the tooth body portion 22a is located relative to the tip. The tooth 22 faces the rotor 3. The tooth tip portion 22b that is located closer to the rotor 3 than the tooth body portion 22a is located relative to the rotor 3.

Figure 3:
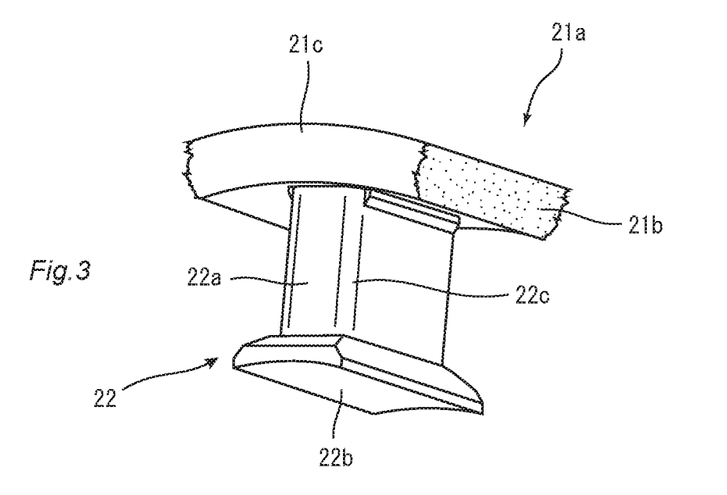
FIG. 3 is a perspective view showing a configuration of a yoke piece.

The tooth body portion 22a is formed in the shape of a quadrangular prism extending inwardly of the yoke 21 from the inner circumferential surface of the yoke 21. The tooth body portion 22a has a rounded portion 22c formed at corners on a side surface thereof extending in the direction of extension of the tooth 22. The rounded portion 22c may be formed at all corners on the aforementioned side surface of the tooth 22, or may be formed at some of the corners. That is, as shown in FIG. 3, the tooth body portion 22a includes, in at least a portion thereof, in a cross section orthogonal to the direction of extension of the tooth 22, a rounded portion 22c having a shape protruding outwardly of the tooth body portion 22a. Note that the direction of extension of the tooth 22 is the same as the radial direction of the stator core 11 (yoke 21).

As shown in FIG. 1, the stator coil 12 is wound around the tooth body portion 22a. By providing the rounded portion 22c on the side surface of the tooth body portion 22a in the manner described above, it is possible to prevent the stator coil 12 wound around the tooth body portion 22a from being damaged. Note that the rounded portion 22c may be a chamfered portion.

As shown in FIG. 3, the tooth body portion 22a is formed such that an end portion of the tooth body portion 22a is located inward of the motor 1 in the axial direction of the stator 2 relative to an end portion of the yoke 21. That is, the tooth body portion 22a has a shorter length in the axial direction than the length of the yoke 21 in the axial direction. This can prevent the stator coil 12 from protruding outwardly of the stator 2 relative to the yoke 21 in the axial direction of the stator in a state in which the stator coil 12 is wound around the tooth body portion 22a.

As shown in FIG. 3, the dimension in the width direction (dimension in the circumferential direction when the stator 2 is viewed from the axial direction) is larger than the dimension in the width direction of the tooth body portion 22a, and the dimension in the axial direction of the tooth tip portion 22b is larger than the dimension in the axial direction of the tooth body portion 22a. That is, the tooth tip portion 22b protrudes in the width direction and the axial direction relative to the tooth body portion 22a.

With this configuration of the tooth tip portion 22b, it is possible to prevent the stator coil 12 wound around the tooth body portion 22a from coming off from the tip of the tooth 22. Accordingly, the stator coil 12 can be more reliably wound around the tooth body portion 22a.

With the above-described configuration of the tooth tip portion 22b, it is also possible to form a strong magnetic field over a wide range around the tooth tip portion 22b when a magnetic field is generated by the stator coil 12 wound around the tooth body portion 22a.

Although not particularly shown, the plurality of yoke pieces 21a obtained by fracturing and splitting the stator core 11 are retained by a retaining member or the like in a state in which the yoke pieces 21a are combined so as to form the original stator core 11. The retaining member may be a dedicated member for retaining the plurality of yoke pieces 21a, or may be constituted by a case accommodating the motor 1.

As shown in FIG. 1, the rotor 3 is formed in a cylindrical shape, and is disposed inward of the stator 2 such that its center of rotation coincides with the axis P of the stator 2. Although not particularly shown, the rotor 3 is fixed to a rotational shaft so as to be rotatable together with the rotational shaft in a state in which the rotational shaft passes therethrough.

The rotor 3 includes a rotor core 31 and field magnets 32. The rotor core 31 is a cylindrical member made of a magnetic material. A plurality of slots 31a for disposing the field magnets 32 are formed on the outer circumferential surface of the rotor core 31. Each of the slots 31a is a recess having a depth that a part of a field magnet 32 is exposed in a state in which the field magnet 32 is disposed in the slot 31a.

In the present embodiment, fourteen slots 31a are formed on the outer circumferential surface of the rotor core 31, as shown in FIG. 1. Each of the slots 31a is formed on the outer circumferential surface of the rotor core 31 so as to extend from one end to the other end of the rotor core 31 in the axial direction.

The field magnet 32 is a permanent magnet, and is formed in the shape of a rectangular solid. The field magnet 32 is fixed in the slot 31a formed on the outer circumferential surface of the rotor core 31 in a state in which a part of the field magnet 32 in the thickness direction is exposed.

(Fracturing and Splitting of Stator Core)

Figure 4:
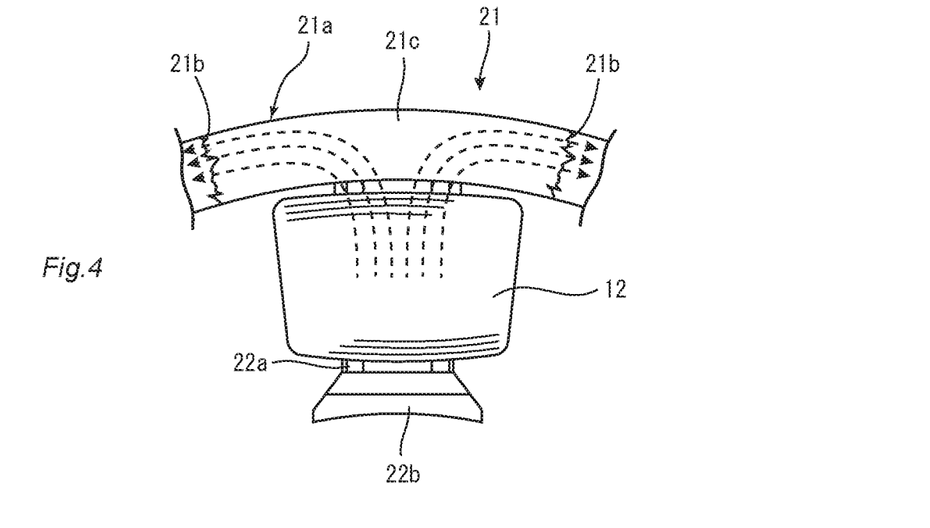
FIG. 4 is a diagram schematically showing the direction of a magnetic flux generated in a yoke of the stator core by energization of the stator coil.

The fracturing and splitting of the yoke 21 of the stator core 11 will be described in detail with reference to FIGS. 2 to 4. FIG. 3 is a perspective view showing a schematic configuration of a yoke piece 21a obtained by fracturing and splitting the yoke 21 of the stator core 11. FIG. 4 is a diagram schematically showing the magnetic flux generated in the yoke 21 when the stator coil 12 is energized to generate a magnetic field.

The yoke 21 of the stator core 11 is fractured and split into a plurality of parts in the circumferential direction. By fracturing and splitting the yoke 21 in the circumferential direction in this manner, a plurality of yoke pieces 21a are formed. Each yoke piece 21a includes a split portion 21c obtained by splitting the yoke 21, and a tooth 22. The yoke 21 is fractured and split such that the yoke pieces 21a each include one of the teeth 22.

As a result of splitting the stator core 11 in this manner, winding of the stator coil 12 around the tooth 22 will not be affected by the adjacent tooth 22. Thus, it is possible to easily wind the stator coil 12 around the tooth 22 of the yoke piece 21a, and increase the number of turns of the stator coil 12 wound around the tooth 22.

The split portion 21c of the yoke piece 21a is obtained by fracturing and splitting the cylindrical yoke 21 in the circumferential direction. Accordingly, the split portion 21c is formed in an arc shape as viewed from the axial direction of the stator 2. The split portion 21c has fracture surfaces 21b at its opposite ends as viewed from the axial direction. That is, the yoke piece 21a has the fracture surfaces 21b disposed relative to each other along the circumferential direction of the yoke 21.

Each fracture surface 21b is formed by fracturing and splitting the yoke 21 in the radial direction when the yoke 21 is viewed from the axial direction. By energizing the stator coil 12 wound around the tooth 22, a magnetic flux is formed from the tooth 22 to the yoke 21 and in the yoke 21 in the circumferential direction of the yoke 21 (see FIG. 4). Thus, as shown in FIG. 4, when the yoke 21 is viewed from the axial direction, the fracture surface 21b extends in a direction orthogonal to the direction (indicated by the dashed arrow in FIG. 4) of a magnetic flux generated in the yoke 21 when the stator coil 12 is energized to generate a magnetic field. In some embodiments, when the yoke 21 is viewed from the axial direction, the fracture surface 21b substantially extends in an orthogonal direction orthogonal to the direction (indicated by the dashed arrow in FIG. 4) of the magnetic flux, but does slightly deviate from the orthogonal direction due to the irregularities on the fracture surface 21b. Nonetheless, a top of the fracture surface 21b is disposed in the radial direction of the stator core 11 from a bottom of the fracture surface 21b.

By forming the fracture surface 21b having the above-described configuration, the area of the fracture surface 21b is decreased as compared with a case where the fracture surface 21b extends in a direction obliquely intersecting the direction of the magnetic flux generated in the yoke 21 when the yoke 21 is viewed from the axial direction. This reduces the possibility that fine fragments fall off from the fracture surface 21b as compared with a case where the fracture surface extends in a direction obliquely intersecting the direction of the magnetic flux. Thus, the configuration of the present embodiment can reduce the possibility that a gap is formed as a result of the fragments falling between the fracture surfaces 21b. Therefore, it is possible to more reliably suppress an increase in the magnetic resistance of the yoke 21.

In the case where the fracture surface extends in a direction obliquely intersecting the direction of the magnetic flux generate in the yoke, the thickness of the yoke piece in the radial direction at the fractured portion of the yoke piece varies in the circumferential direction of the yoke. In this respect, by forming the fracture surface 21b so as to extend in a direction orthogonal to the direction of the magnetic flux generated in the yoke 21 as in the configuration of the present embodiment, the above-described thickness of the yoke piece 21a can be made uniform in the circumferential direction. Accordingly, it is possible to suppress a reduction in the strength of the yoke piece 21a.

In the present embodiment, the case where the fracture surface 21b extends in a direction orthogonal to the direction of the magnetic flux when the yoke 21 is viewed from the axial direction includes not only a case where the fracture surface 21b intersects the direction of the magnetic flux at a right angle, but also cases where the fracture surface 21b intersects the direction of the magnetic flux within a predetermined angle range including a right angle (e.g., a range from 80 to 100 degrees).

As described above, since the stator core 11 is a dust core made of particulates including particles of a magnetic material, the stator core 11 is fractured along the boundaries between particles when the stator core 11 is fractured and split. Accordingly, the fracture surface 21b of the yoke piece 21a has a large number of irregularities. Therefore, when the fracture surfaces 21b of the yoke pieces 21a are combined together so as to restore the yoke 21 to the original shape after the yoke 21 has been fractured and split to form the yoke pieces 21a, the irregularities (such as concavities and convexities) formed on the fracture surfaces 21b can be engaged with each other. Accordingly, a space tends not to be formed between the fracture surfaces 21b of the yoke pieces 21a.

Herein, the fracturing and splitting mean causing the yoke 21 to undergo brittle fracture by applying a force to the yoke 21. That is, the fracturing and splitting mean causing the yoke 21 of the stator core 11, which is a dust core, to undergo brittle fracture such that the yoke 21 is fractured along the boundaries between the particles constituting the dust core. Accordingly, a large number of irregularities are formed on the fracture surface 21b formed at the time of fracturing and splitting the yoke 21. Consequently, the fracture surface 21b has a satin-like surface. Note that the fracture surface 21b means a surface that is formed when the yoke 21 is broken as a result of losing the cohesive force of the particles in the yoke 21 of the stator core 11, which is a dust core.

In the case of forming the yoke pieces by machining or the like as in the conventional configurations, the yoke pieces come into surface contact with each other. Accordingly, a gap tends to be formed between the contact portions. Therefore, the magnetic resistance of the yoke when the yoke is split is larger than that of an integral yoke. In this respect, by fracturing and splitting the yoke 21 of the stator core 11, which is a dust core, to obtain a plurality of yoke pieces 21a as in the present embodiment, a space tends not to be formed between the fracture surfaces 21b when the yoke pieces 21a are combined with each other. That is, by bringing the fracture surfaces 21b into contact with each other in mutually adjacent yoke pieces 21a, the irregularities on the fracture surface 21b of a yoke piece 21a come into contact with the irregularities on the fracture surface 21b of the adjacent yoke piece 21a. This can suppress an increase in the magnetic resistance of the yoke 21 even in a configuration in which the yoke 21 is split. Note that the contact between the fracture surfaces 21b includes not only contact of all of the irregularities formed on the fracture surface 21b with the irregularities on another fracture surface 21b, but also contact of some of the irregularities formed on the fracture surface 21b with the irregularities on another fracture surface 21b.

Moreover, the stator core 11 is a dust core made of particulates including particles of a magnetic material as described above. Accordingly, when a part of the yoke 21 is cracked off at the time of fracturing and splitting the yoke 21, the fragments are broken along the boundaries between the particles. Thus, the irregularities formed by the fragments can be engaged with the irregularities at the cracked positions of the yoke piece 21a, and the fragments can be easily fixed to the yoke piece 21a by using an adhesive or the like. Accordingly, the yoke piece 21a can be easily repaired.

When the stator core is an integral component, the interval between the tooth tip portions of mutually adjacent teeth is narrow. Therefore, when the stator coil is wound around the teeth, there is not much space between the tooth tip portions to dispose a nozzle or the like of an apparatus that performs winding. Thus, when the stator core is an integral component, there are constraints on the number of turns of the stator coil that can be wound around the teeth.

In this respect, the stator core 11 of the present embodiment is fractured and split such that the yoke pieces 21a each include one of the teeth 22. This makes it possible to wind the stator coil 12 around each of the teeth 22 by using a winding apparatus. Accordingly, it is possible to easily wind the stator coil 12 around the teeth 22, and increase the number of turns of the stator coil 12 that can be wound around the teeth 22.

Effect of the Embodiment

In the present embodiment, a motor 1 includes a stator 2. The stator 2 includes a stator core 11 including a cylindrical yoke 21 extending in the axial direction and a plurality of teeth 22 extending inwardly of the yoke 21 in the radial direction from the inner circumferential surface of the yoke 21, and a stator coil 12 wound around the teeth 22. The stator core 11 is a dust core that uses particulates including particles of a magnetic material, and includes a plurality of yoke pieces 21a that have fracture surfaces 21b and are formed by splitting the yoke 21 into a plurality of portions in the circumferential direction. Each of the plurality of yoke pieces 21a includes a tooth 22.

In the present embodiment, the yoke 21 of the stator core 11 is fractured and split into a plurality of portions in the circumferential direction such that each of the yoke pieces 21a includes the tooth 22, as described above. This makes it possible to wind the stator coil 12 around the tooth 22 for each yoke piece 21a. Thus, the number of turns of the stator coil 12 wound around the tooth 22 can be increased as compared with a configuration in which the stator core 11 is an integral component. This can improve the output torque of the motor 1.

In the present embodiment, the stator core 11 is a dust core that uses particulates including particles of a magnetic material. Since the yoke 21 of the stator core 11 is fractured and split into a plurality of portions in the circumferential direction, irregularities are formed on the fracture surface 21b. Accordingly, in the case of forming the stator core 11 by combining the fracture surfaces 21b of the yoke piece 21a as in the configuration of the present embodiment, the number of contact points on the fracture surfaces 21b of mutually adjacent yoke pieces 21a is larger than that in the case where the stator core is formed by combining flat surfaces of a plurality of components. Thus, with the configuration of the present embodiment, it is possible to suppress an increase in the magnetic resistance of the yoke 21.

Accordingly, with the configuration of the present embodiment, it is possible to achieve both an increase in the number of turns of the stator coil 12 and a suppression of an increase in the magnetic resistance of the stator core 11.

In the present embodiment, the fracture surface 21b extends, when the yoke 21 is viewed from the axial direction, in a direction orthogonal to the direction of the magnetic flux generated in the yoke 21 when a current flows through the stator coil 12.

When the yoke 21 is fractured and split into a plurality of yoke pieces 21a, there is the possibility that fine fragments fall off from the fracture surface 21b. The position where the fragments have fallen off forms a gap when the yoke pieces 21a are combined with each other on the fracture surfaces 21b, and therefore, the magnetic resistance is increased at that portion.

In this respect, by forming the fracture surface 21b having the above-described configuration, the area of the fracture surface 21b is decreased as compared with a case where the fracture surface extends in a direction obliquely intersecting the direction of the magnetic flux generated in the yoke, as viewed from the axial direction of the stator 2. This reduces the possibility that fine fragments fall off from the fracture surface 21b as compared with a case where the fracture surface extends in a direction obliquely intersecting the direction of the magnetic flux. Thus, the configuration of the present embodiment can reduce the possibility that a gap is formed between the fracture surfaces 21b. Therefore, it is possible to more reliably suppress an increase in the magnetic resistance of the yoke 21.

In the case where the fracture surface extends in a direction obliquely intersecting the direction of the magnetic flux generate in the yoke, the thickness of the yoke piece in the radial direction at the fractured portion of the yoke piece varies in the circumferential direction of the yoke. Such differences in the thickness of the yoke piece affect the strength of the yoke piece. In this respect, by forming the fracture surface 21b so as to extend in a direction orthogonal to the direction of the magnetic flux generated in the yoke 21 as in the configuration of the present embodiment, the above-described thickness of the yoke piece 21a can be made uniform in the circumferential direction. Accordingly, it is possible to suppress a reduction in the strength of the yoke piece 21a.

In the present embodiment, the teeth 22 each include a tooth body portion 22a around which the stator coil 12 is wound, and a tooth tip portion 22b that is located closer to the tip of the teeth 22 than the tooth body portion 22a. An end portion of the tooth body portion 22a is located inward of the stator core 11 in the axial direction of the stator 2 relative to an end portion of the yoke 21.

The end portion of the tooth body portion 22a of the tooth 22 is located inward of the stator core 11 in the axial direction of the stator 2 relative to the end portion of the yoke 21. Accordingly, when the stator coil 12 is wound around the tooth body portion 22a, the stator coil 12 can be wound around the tooth 22 in a compact manner. Therefore, it is possible to increase the number of turns of the stator coil 12 without increasing the size of the motor 1.

In the present embodiment, the teeth 22 each include a tooth body portion 22a around which the stator coil 12 is wound, and a tooth tip portion 22b that is located closer to the tip of the teeth 22 than the tooth body portion 22a is. The tooth body portion 22a includes, in at least a portion thereof, in a cross section orthogonal to the radial direction of the yoke 21, a rounded portion 22c having a shape protruding outwardly of the tooth body portion 22a.

By providing the rounded portion 22c on the tooth body portion 22a of the tooth 22, it is possible to prevent the stator coil 12 from being damaged by the tooth body portion 22a when the stator coil 12 is wound around the tooth body portion 22a. It is preferable that the rounded portion 22c is provided at all corners of the tooth body portion 22a when the tooth body portion 22a is viewed in a cross section orthogonal to the radial direction of the yoke 21. This can more reliably prevent the stator coil 12 from being damaged by the tooth body portion 22a when the stator coil 12 is wound around the tooth body portion 22a.

Other Embodiments

Although an embodiment of the present invention has been described above, the above-described embodiment is merely an example for implementing the present invention. Therefore, the present invention is not limited to the above-described embodiment, and various modifications may be made to the embodiment without departing from the gist of the present invention.

In the above-described embodiment, the yoke 21 of the stator core 11 is fractured and split into a plurality of portions in the circumferential direction. However, the stator core 11 may be split into a plurality of portions in the axial direction of the stator 2.

Figure 5:
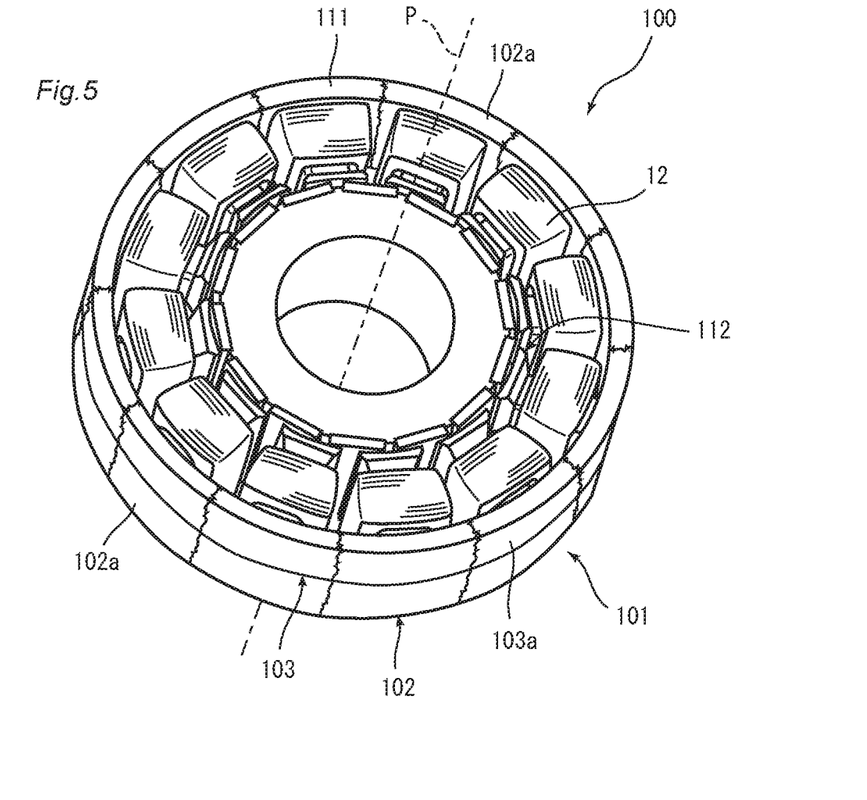
FIG. 5 is an overall configuration of a motor according to another embodiment, corresponding to FIG. 1.

For example, as shown in FIG. 5, a stator core 101 of a motor 100 may be split into two portions in the axial direction of the stator. Specifically, the stator core 101 includes two annular components 102 and 103 (tube portions) that are stacked concentrically in the axial direction. The annular components 102 and 103 include, for example, portions formed by splitting each of the yoke 111 and the teeth 112 of the stator core 101 are split into two portions in the axial direction. That is, the stator core 101 is formed by stacking the two annular components 102 and 103 in the axial direction. Although not particularly shown, an insulating member made of a resin material is disposed between the two annular components 102 and 103.

Each of the annular components 102 and 103 is fractured and split into a plurality of yoke pieces 102a and 103a in the circumferential direction as in the above-described embodiment. In this case as well, each of the annular components 102 and 103 is fractured and split so as to include portions constituting the teeth 112 as in the above-described embodiment.

As described above, as a result of forming the yoke 111 with a plurality of annular components 102 and 103 that are stacked concentrically in the axial direction of the stator, the length in the axial direction of the portion constituting the yoke 111 in each of the annular components 102 and 103 is shorter than the length in the axial direction of the yoke that is integrally formed. Thus, it is possible to easily fracture and split the annular components 102 and 103 in the circumferential direction.

Moreover, in the above-described configuration, the yoke 111 is formed with a plurality of annular components 102 and 103 that are stacked in the axial direction. Thus, an eddy current is generated in each of the two annular components 102 and 103 in the axial direction. Accordingly, the above-described configuration can reduce the eddy current generated in the stator core 101 in the axial direction as compared with a configuration in which the stator core is formed integrally in the axial direction. This can suppress a temperature increase in the stator core 101. Therefore, it is possible to increase the output torque of the motor 100.

In the above-described configuration, the stator core 101 is formed by stacking the two annular components 102 and 103 in the axial direction. However, the stator core may be formed by stacking three or more annular components in the axial direction.

In the above-described embodiment, the fracture surfaces 21b is formed on the yoke piece 21a so as to extend, when the yoke 21 is viewed from the axial direction, in a direction orthogonal to the direction of a magnetic flux generated in the yoke 21 when the stator coil 12 is energized to generate a magnetic field. However, the fracture surface 21b may be formed on the yoke piece so as to extend in a direction obliquely intersecting the direction of the magnetic flux.

In the above-described embodiment, the motor 1 is an inner rotor type motor in which the cylindrical rotor 3 is disposed inward of the cylindrical stator 2 such that the axis P of the stator 2 coincides with the center of rotation. However, the motor 1 may be an outer rotor type motor in which a cylindrical rotor is disposed outward of a cylindrical or columnar stator such that the axis of the stator coincides with the center of rotation. In the case of an outer rotor type motor, the teeth of the stator core extend outwardly of the yoke in the radial direction from the outer circumferential surface of the cylindrical or columnar yoke.

In the above-described embodiment, the motor 1 is an SPM (Surface Permanent Magnet) inner rotor type motor in which the field magnets 32 are disposed on the outer circumferential surface of the rotor core 31. However, the motor 1 may be an IPM (Interior Permanent Magnet) motor in which filed magnets are disposed inside the rotor core, or may be an outer rotor type motor. The number of the field magnets 32 and the number of the teeth 22 may be different from those of the configuration of the present embodiment.

In the above-described embodiment, the yoke piece 21a includes a split portion 21c, which is obtained by splitting the yoke 21, and a tooth 22. That is, the yoke 21 is fractured and split such that the yoke pieces 21a each include one of the teeth 22. However, the yoke 21 may be split in any manner in the circumferential direction so long as the teeth 22 are included in different yoke pieces 21a. For example, a portion of the yoke 21 may be split into yoke pieces 21a that do not include a tooth 22. That is, a tooth 22 may be provided on each of at least some of the plurality of yoke pieces 21a.

Specifically, the yoke 21 may be fractured and split such that a yoke piece 21a that includes a tooth 22 and a yoke piece 21a that does not include a tooth 22 are alternately positioned. The yoke 21 may be fractured and split such that a plurality of yoke pieces 21a that do not include a tooth 22 are positioned between a yoke piece 21a that includes a tooth 22 and another yoke piece 21a that includes a tooth 22.

In a configuration in which the stator core 101 is split into a plurality of portions in the axial direction of the stator as shown in FIG. 5 described above, at least one of the annular components 102 and 103 may be fractured and split so as to include a yoke piece that does not include a tooth 112. In this case, the annular components 102 and 103 may be fractured and split such that one or more yoke pieces that do not include a tooth 112 are positioned between a yoke piece that includes at least a portion of a tooth 112 and a yoke piece that includes at least a portion of a tooth 112.

In the above-described embodiment, the fracture surface 21b means a surface that is formed in the yoke piece 21a when the yoke 21 is broken as a result of losing the cohesive force of the particles in the yoke 21 of the stator core 11, which is a dust core. That is, the fracture surface 21 is a surface that the yoke piece 21a has in the circumferential direction of the yoke 21 after the yoke 21 has been fractured and split. The fracture surface 21b is a surface having irregularities that come into contact with the irregularities of the opposing fracture surface 21b in mutually adjacent yoke pieces 21a of the plurality of yoke pieces 21a constituting the yoke 21. The contact of the irregularities includes not only contact of all of the irregularities formed on the surface, but also contact of some of the irregularities formed on the surface.

What is claimed is:

1. An electrical rotating machine comprising a stator, the stator including:
    a stator core that is a dust core including particulates having particles of a magnetic material, the stator core including,
        a cylindrical yoke extending in an axial direction of the stator, the yoke including a plurality of yoke pieces having fracture surfaces disposed relative to each other along a circumferential direction of the yoke, adjacent fracture surfaces of the fracture surfaces of mutually adjacent yoke pieces of the plurality of yoke pieces having the adjacent fracture surfaces in contact with each other, and
        a plurality of teeth extending in a radial direction of the yoke from an inner circumferential surface of the yoke or an outer circumferential surface of the yoke, each of the teeth being provided on each of at least one of the plurality of yoke pieces; and
    a stator coil wound around the teeth,
    wherein the fracture surfaces are formed by fracturing and splitting, and then re-forming, the cylindrical yoke.

2. The electrical rotating machine according to claim 1, wherein said fracture surfaces extend, when the yoke is viewed from the axial direction, substantially in a direction orthogonal to a direction of a magnetic flux generated in the yoke when a current flows through the stator coil.

3. The electrical rotating machine according to claim 1, wherein the yoke includes a plurality of tube portions that are stacked on each other concentrically in the axial direction, and
    each of the plurality of tube portions is split into a plurality of portions in the circumferential direction so as to form the plurality of yoke pieces.

4. The electrical rotating machine according to claim 1, wherein each respective tooth of the teeth includes:
    a tooth body portion around which the stator coil is wound; and
    a tooth tip portion that is located closer to a tip of the respective tooth than the tooth body portion is located relative to the tip, and
    in the axial direction, an end portion of the tooth body portion is located farther inward of the stator core relative to an end portion of the yoke.

5. The electrical rotating machine according to claim 1, wherein each respective tooth of the teeth includes:
    a tooth body portion around which the stator coil is wound; and
    a tooth tip portion that is located closer to a tip of the respective tooth than the tooth body portion is located relative to the tip, and
    in a cross section orthogonal to the radial direction of the yoke, the tooth body portion includes, in at least a portion thereof, a rounded portion having a shape protruding outwardly from a part of the tooth body portion.

6. The electrical rotating machine according to claim 1, further comprising a rotor, the teeth of the stator core facing the rotor.

7. The electrical rotating machine according to claim 6, wherein each respective tooth of the teeth includes:
    a tooth body portion around which the stator coil is wound; and
    a tooth tip portion that is located closer to the rotor than the tooth body portion is located relative to the rotor, and
    in the axial direction, an end portion of the tooth body portion is located farther inward in the stator core relative to an end portion of the yoke.

8. The electrical rotating machine according to claim 1, wherein each of said fracture surfaces has irregularities such that said fracture surface has concavities and convexities.

9. A stator for an electrical rotating machine, the stator comprising:
    a stator core that is a dust core including particulates having particles of a magnetic material, the stator core including
        a cylindrical yoke extending in an axial direction of the stator, the yoke including a plurality of yoke pieces each having fracture surfaces disposed relative to each other along a circumferential direction of the yoke, each of the yoke pieces having one of the fracture surfaces thereof in direct contact with one of the fracture surfaces of another of the yoke pieces, and
        a plurality of teeth extending in a radial direction of the yoke from the yoke, each of the teeth being provided on one of the plurality of yoke pieces; and a stator coil wound around the teeth;
wherein the fracture surfaces are formed by fracturing and splitting, and then re-forming, the cylindrical yoke.

10. The stator according to claim 9, wherein each of the fracture surfaces has irregularities such that the fracture surface has concavities and convexities.

* * * * *